(No Model.)
G. W. POTTER.
SLEIGH RUNNER.
No. 352,887. Patented Nov. 16, 1886.
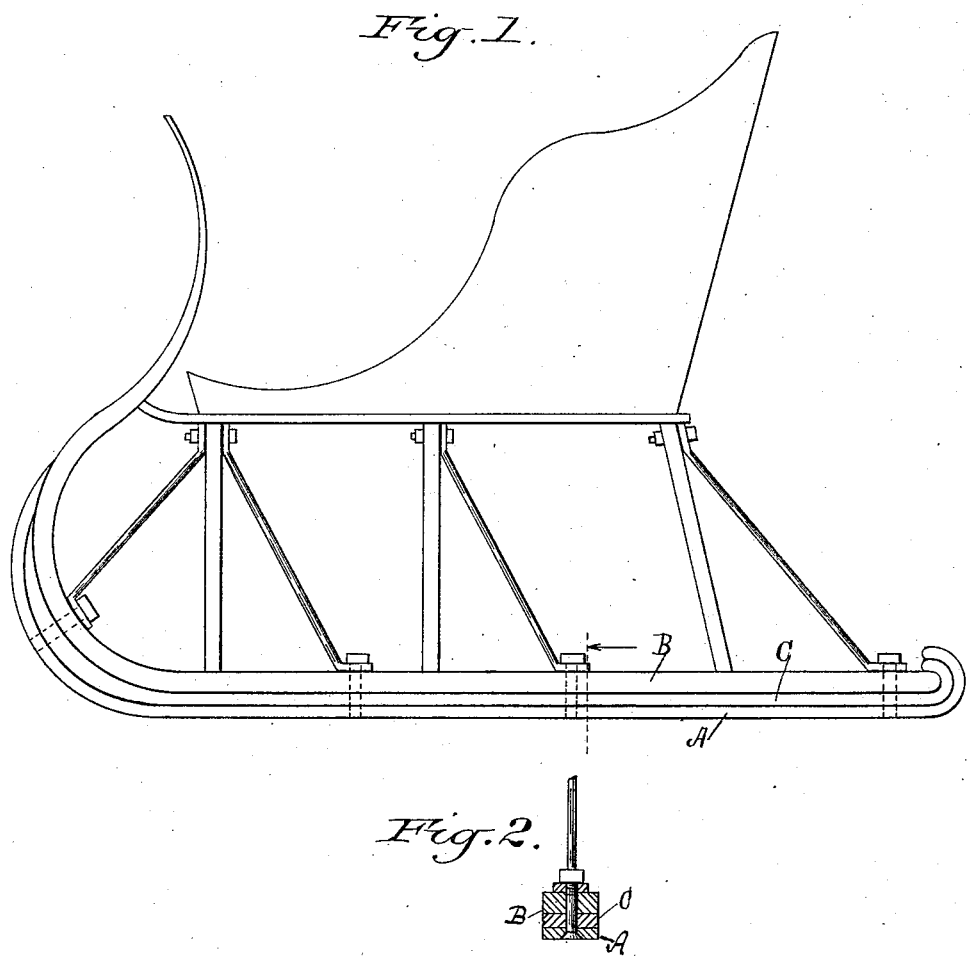
Attest:
Fred G. Beach
M. K. Beach
Inventor:
George W. Potter

UNITED STATES PATENT OFFICE.

GEORGE W. POTTER, OF ALBION, NEW YORK.

SLEIGH-RUNNER.

SPECIFICATION forming part of Letters Patent No. 352,887, dated November 16, 1886.

Application filed August 27, 1885. Renewed July 12, 1886. Serial No. 207,823. (No model.)

*To all whom it may concern:*

Be it known that I, GEORGE W. POTTER, a citizen of the United States, residing at Albion, in the county of Orleans and State of New York, have invented certain new and useful Improvements in Sleigh-Runners, of which the following is a description.

The object of my invention is to provide sleighs, sleds, and cutters with runners or shoes which shall cause less friction and be of greater durability than iron or steel shoes; and my improvement consists in making the runners or shoes of annealed or toughened glass, of suitable shape and thickness, which may be attached to the sleighs as iron or steel shoes are commonly fastened.

Figure 1 is a side view of a sleigh, and Fig. 2 is a cross-section of its runner with my glass shoe attached.

In the accompanying drawings, A represents the glass shoe attached to the iron or wooden runner B. C is an intermediate strip of suitable material, the dotted lines showing the location of the bolts where the same are used to fasten the shoe.

I do not claim any method of attaching runners to sleighs; but

I do claim as my invention—

1. A sleigh having shoes of annealed or toughened glass attached to the runners, substantially as set forth.

2. A sleigh having shoes of annealed or toughened glass, and strips C, both shoes and strips being attached to the runners, substantially as set forth.

GEORGE W. POTTER.

Witnesses:
FREDERIC G. BEACH,
EDWARD E. MIX.